United States Patent
Tseng et al.

(10) Patent No.: US 6,397,736 B1
(45) Date of Patent: Jun. 4, 2002

(54) FRUIT AND VEGETABLE JUICE EXTRACTOR

(76) Inventors: Rong-Yuan Tseng, 10F, No. 3, Lane 65, Sec. 2, Chung Hsiao Rd., San Chorng City, Taipei Hsien; Kuo-I Ling, 9F, No. 12, Alley 31, Lane 105, Sec. 2, Chung Hsiao Rd., San Chorng City, Taipei Hsien, both of (TW)

( * ) Notice: Subject to any disclaimer, the term of this patent is extended or adjusted under 35 U.S.C. 154(b) by 0 days.

(21) Appl. No.: 09/986,491

(22) Filed: Nov. 9, 2001

(51) Int. Cl.[7] .............................. A23N 1/00; A23N 1/02; A23L 1/00
(52) U.S. Cl. ........................................................ 99/511
(58) Field of Search .......................... 99/348, 484, 489, 99/492, 493, 495, 509–513; 210/360.1, 380.1, 369; 241/36, 37.5, 92, 282.1; 366/197, 199, 205, 601; 494/36, 43, 56, 58; 426/643, 615, 616, 533, 495, 481, 489, 478

(56) References Cited

U.S. PATENT DOCUMENTS

| 3,533,563 A | * | 10/1970 | Eriksson | 241/92 X |
| 3,799,522 A | * | 3/1974 | Loomans | 366/601 |
| 4,025,056 A | * | 5/1977 | Miles et al. | 366/197 X |
| 4,073,013 A | * | 2/1978 | Blach | 366/601 |
| 4,506,601 A | * | 3/1985 | Ramirez et al. | 99/513 |
| 4,613,086 A | * | 9/1986 | Granum et al. | 241/37.5 X |
| 4,874,136 A | * | 10/1989 | Webster | 241/92 X |
| 4,924,770 A | * | 5/1990 | Raub | 99/510 |
| 5,031,522 A | * | 7/1991 | Birixel et al. | 99/511 |
| 5,193,448 A | * | 3/1993 | Antonio | 99/512 |
| 5,353,697 A | * | 10/1994 | Venturati et al. | 99/492 |
| 5,433,144 A | * | 7/1995 | Lee | 99/513 |
| 5,452,650 A | * | 9/1995 | Lee | 99/510 |

* cited by examiner

*Primary Examiner*—Timothy F. Simone
(74) *Attorney, Agent, or Firm*—Rosenberg, Klein & Lee

(57) ABSTRACT

A fruit and vegetable juice extractor includes a lower and an upper base, a strainer basket and a disc cutter received in the upper base, and a top cover having a centered feed tube via which a whole piece of fruit or vegetable may be fed toward and ground into mash by the disc cutter to produce rich amount of juice. The disc cutter is provided at peripheral areas with a plurality of teeth as blades, and at a central area with curved blades arranged into a cross. One of the central blades has an end extended across a center of the disc cutter to eliminate a dead angle of grinding at the center of the disc cutter. Therefore, the feed tube may be vertically aligned with the center of the disc cutter and have increased diameter to receive a whole piece of fruit or vegetable for juicing.

4 Claims, 5 Drawing Sheets

FRUIT AND VEGETABLE JUICE EXTRACTOR

BACKGROUND OF THE INVENTION

The present invention relates to a fruit and vegetable juice extractor, and more particularly to a fruit and vegetable juice extractor into which a whole piece of fruit or vegetable may be fed to produce juice, so that cutting of the fruit or vegetable into small pieces before feeding is saved and the juice extractor is more effective and practical for use.

Generally, a fruit and vegetable juice extractor includes, among other parts, a disc cutter rotatable at high speed, and a feed tube via which fruit or vegetable is fed to and ground by the disc cutter to produce juice. The disc cutter for the above-described conventional fruit and vegetable juice extractor has a dead angle of grinding at a central area thereof due to the arrangement of cutter blades thereof. To avoid the central dead angle of grinding, the feed tube is normally located at an eccentric position on the juice extractor. For this reason, the feed tube is limited to a bore that could not be too large. Due to the limited bore of the feed tube, fruit and vegetable to fed into the juice extractor are preferably cut into small pieces before being fed into the feed tube. This will, of course, bring inconveniences to a user. In the event the feed tube is expanded to have an increased bore for receiving a whole piece of fruit or vegetable, the eccentric position of the feed tube necessitates an increased volume of the whole juice extractor to result in increased manufacturing cost and inconvenient storage of the juice extractor.

SUMMARY OF THE INVENTION

A primary object of the present invention is to provide an improved fruit and vegetable juice extractor into which a whole piece of fruit or vegetable may be fed for grinding and juicing to save the trouble of cutting the fruit or vegetable into small pieces.

To achieve the above object, the present invention includes a disc cutter that is provided at a central area with curved blades arranged into a form of a cross, and one of the curved blades has an end extended across a center of the disc cutter to eliminate the central dead angle of grinding on the disc cutter. With the central dead angle of grinding removed from the disc cutter, it is possible for the feed tube to align with the center of the disc cutter and has a bore twice as large as that of the conventional feed tube without increasing the total volume of the juice extractor. And, the expanded bore of the feed tube allows feeding of whole pieces of fruit or vegetable into the feed tuber Another object of the present invention is to provide an improved fruit and vegetable juice extractor that includes a hollow cylindrical feed tube, one side of which is chamfered to prevent whole pieces of fruit or vegetable fed thereinto from rotating along with the disc cutter while the latter rotates at high speed, so that the fed fruit or vegetable is fully ground to produce as much juice as possible.

A further object of the present invention is to provide an improved fruit and vegetable juice extractor that includes a plunger for pushing fruit or vegetable into a feed tube for grinding, and the plunger is provided at a bottom end surface with two intersected rows of teeth. These teeth firmly grip the fruit or vegetable fed into the feed tube and thereby prevent the fruit or vegetable in the feed tube from vibrating to facilitate smooth feeding of fruit or vegetable.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
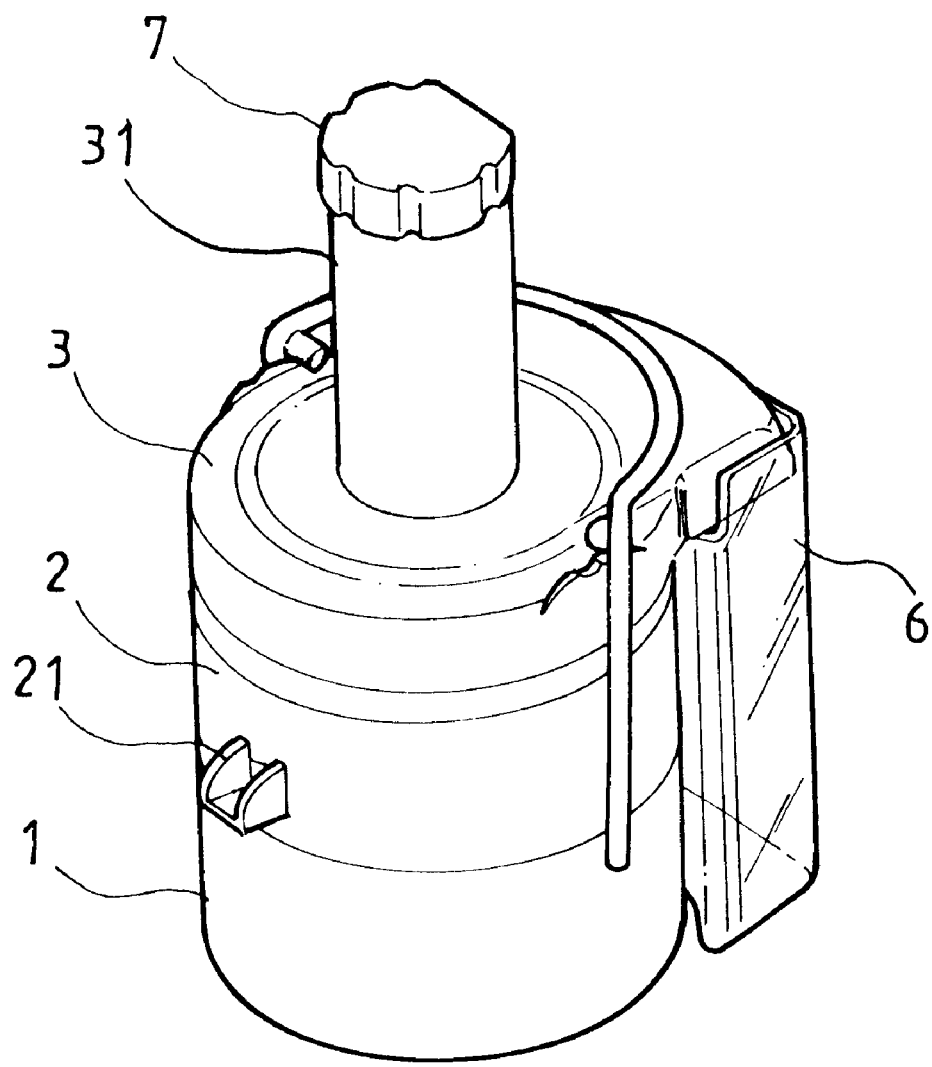
FIG. 1 is an assembled perspective view of a fruit and vegetable juice extractor according to the present invention.
Figure 2B:
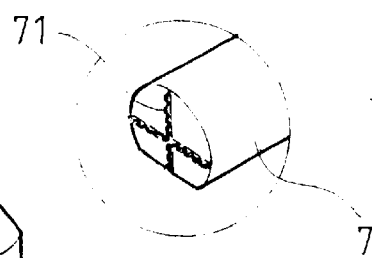
FIG. 2 is an exploded perspective view of FIG. 1.
Figure 2A:
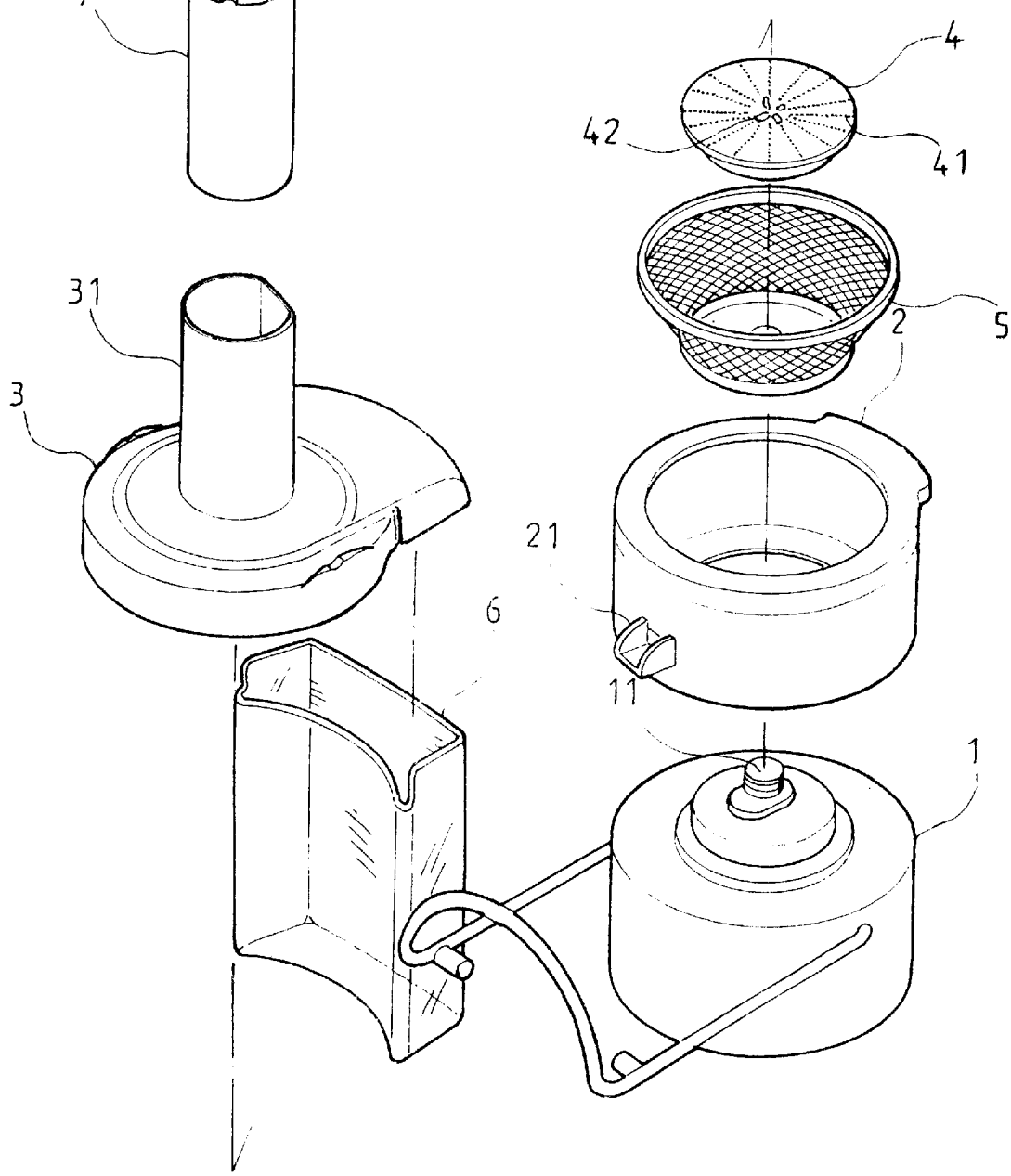

Please refer to FIGS. 1 and 2 at the same time. The fruit and vegetable juice extractor of the present invention mainly includes a lower base 1, an upper base 2, and a top cover 3.

The lower base 1 is provided at a top center with a driving shaft 11 that is driven to rotate via a motor (not shown) in the lower base 1.

The upper base 2 is fitly mounted on the lower base 1 to receive a strainer basket 5 and a disc cutter 4 therein. The disc cutter 4, after being positioned in the strainer basket 5, is screwed onto the driving shaft 11. A spout 21 is provided at one lower side of the upper base 2 to release produced juice.

The top cover 3 is provided at a top center with a generally hollow cylindrical feed tube 31. One side of the feed tube 31 is properly chamfered. A pulp collector 6 is attached to one lower side of the top cover 3 to collect pulp centrifugally thrown out of the juice extractor.

The disc cutter 4 is provided at peripheral areas on a top surface thereof with radially arranged tooth-like cutter blades 41. A central area of the top surface of the disc cutter 4 is provided with curved blades 42 arranged in the form of a cross. A whole piece of fruit or vegetable without being cut into small pieces is fed into the juice extractor via the feed tube 31. A plunger 7 is used to push the fed fruit or vegetable deep into the feed tube 31. The plunger 7 is provided at a bottom end surface with two intersected rows of teeth 71 that firmly grip and prevent the fruit or vegetable in the feed tube 31 from vibrating or rotating while being pushed toward the disc cutter 4. The whole piece of fruit or vegetable is ground by the disc cutter 4 into mash to produce rich amount of juice that flows out of the upper base 2 via the spout 21. Any pulp or residue from the mashed fruit or vegetable is centrifugally thrown out of the strainer basket 5 and collected in the pulp collector 6.

Figure 3:
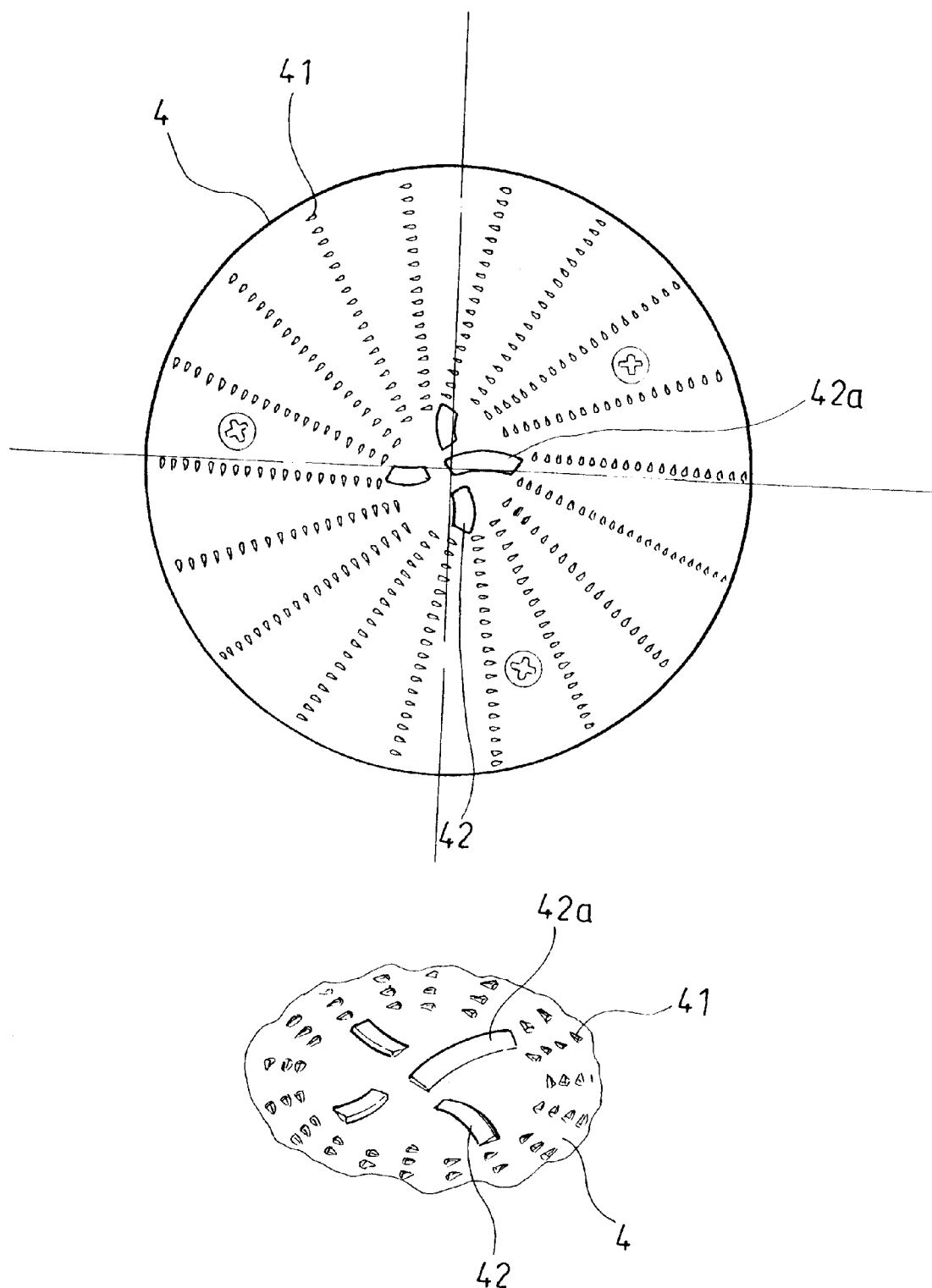
FIG. 3 is a top plan view of a first embodiment of the disc cutter adopted in the fruit and vegetable juice extractor of the present invention.

Please refer to FIG. 3. The disc cutter 4 of the present invention is provided at peripheral areas on its top surface with a plurality of tooth-like cutter blades 41 arranged into a plurality of radial rows. The central area of the disc cutter 4 is particularly provided with curved blades 42 that are radially arranged around a center of the disc cutter 4 to look like a cross. One of the curved blades 42, which is denoted with a reference number of 42a, has an end extends across the center of the disc cutter 4. Whereby, when the disc cutter 4 is driven by the driving shaft 11 to rotate at high speed and thereby grinding the fruit or vegetable fed to it, the curved blades 42, particularly the curved blade 42a, eliminate the dead angle of grinding that normally exists at the central area of the disc butter of a conventional fruit and vegetable juice extractor. Thus, the whole piece of fruit or vegetable fed into the juice extractor could be completely ground and mashed to produce as much juice as possible. Moreover, since the curved blades 42 provided at the center of the disc cutter 4 eliminate the dead angle of grinding, it is not necessary for the feed tube 31 to locate at an eccentric position. On the contrary, the feed tube 31 may be aligned with the center of the disc cutter 4 and to have an increased diameter without the necessity of an increased volume for the bases 1 and 2.

Figure 4:
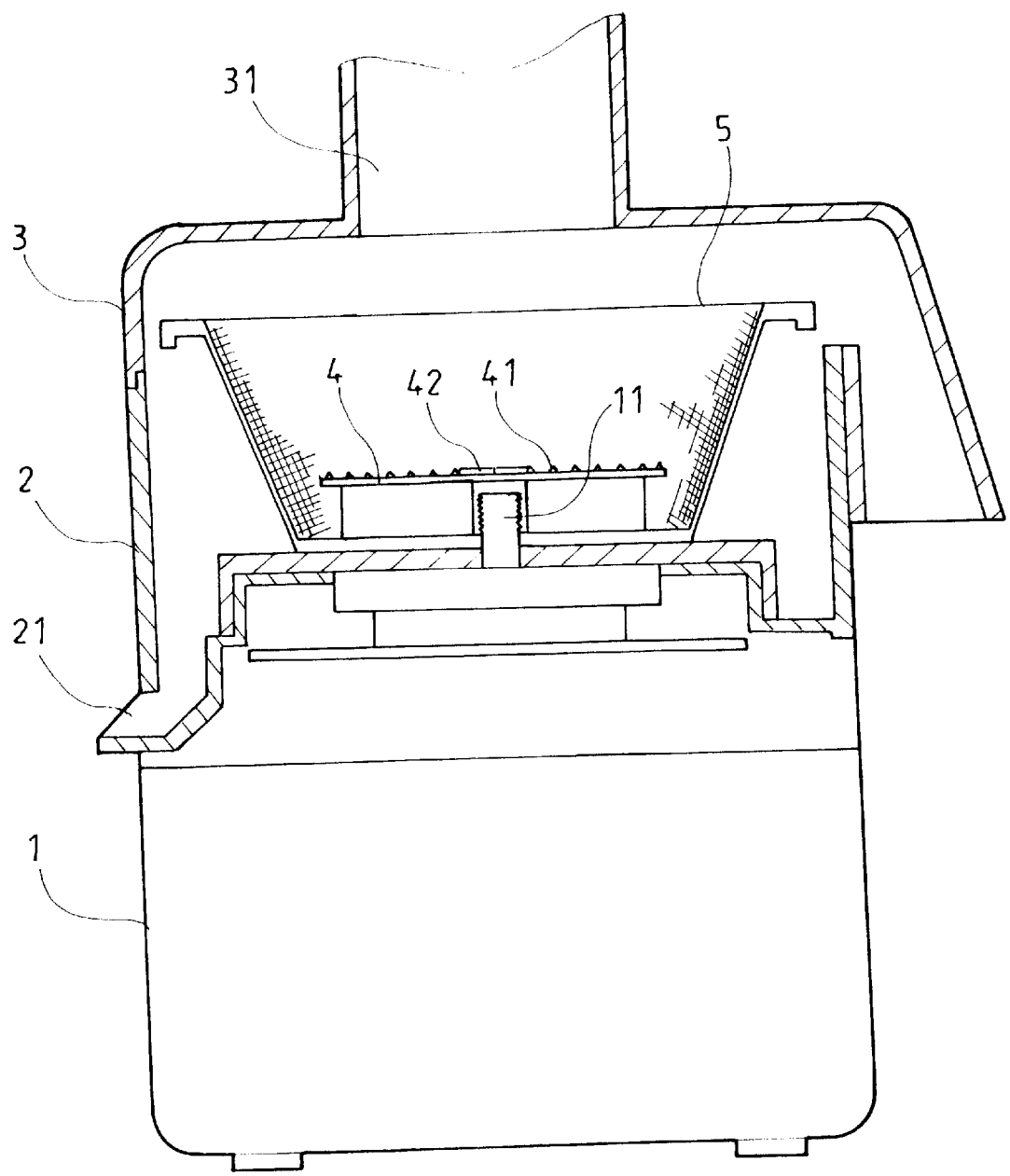
FIG. 4 is an assembled sectional view of FIG. 1.

Please refer to FIG. 4 that is an assembled sectional view of the present invention. As can be clearly seen in FIG. 4, the feed tube 31 is located at a center of the whole juice extractor and is vertically aligned with the disc cutter 4. Since the whole disc cutter 4 is provided at peripheral areas with the tooth-like cutter blades 41 and at the central area with the curved blades 42, the whole piece of fruit or vegetable fed into the upper base 2 is completely cut and ground into mash by the blades 41, 42 to produce rich amount of juice without leaving any big solid piece due to any dead angle of grinding on the disc cutter 4.

Figure 5:
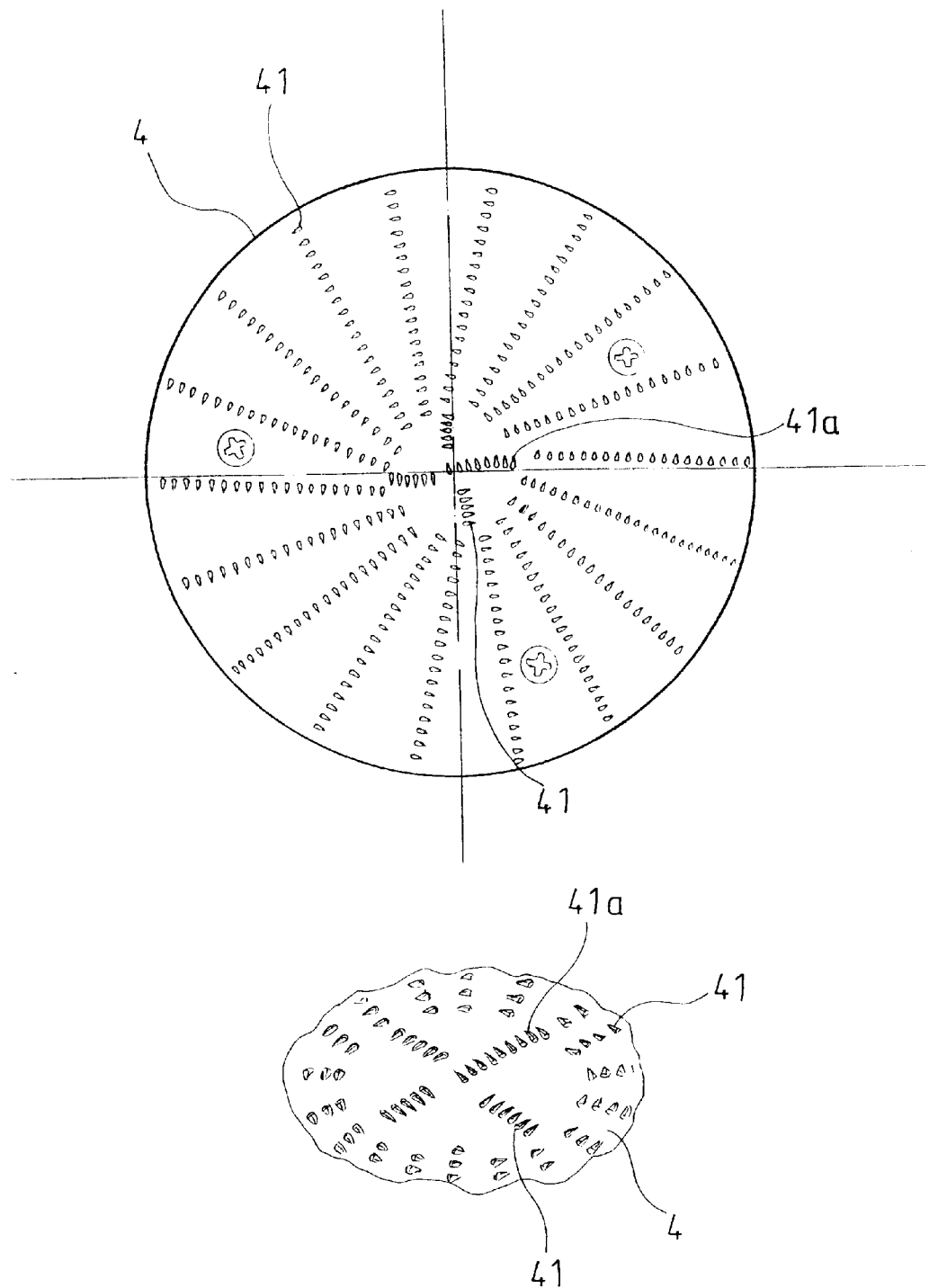
FIG. 5 is a top plan view of a second embodiment of the disc cutter of the present invention.

Another embodiment of the disc cutter 4 is shown in FIG. 5. In this embodiment, the disc cutter 4 is provided at the central area with tooth-like blades 41 arranged into, for example, four radial rows similar to a cross. Again, one of the four rows of tooth-like blades 41, which is denoted with a reference number of 41a, has an end extended across the center of the disc cutter 4 to eliminate the dead angle of grinding on the disc cutter 4.

What is claimed is:

1. A fruit and vegetable juice extractor, comprising a lower base, an upper base fitly mounted on said lower base, a strainer basket received in said upper base, a disc cutter having tooth-like cutter blades radially arranged on peripheral areas thereof and located in said strainer basket, and a top cover; said lower base being provided with a driving shaft, to which said disc cutter located in said strainer basket is screwed; said top cover being provided at a top center with a hollow cylindrical feed tube, one side of which being properly chamfered; such that a whole piece of fruit or vegetable may be fed into said feed tube and pushed with a plunger toward said disc cutter that is driven by said driving shaft to rotate at high speed and thereby grind said fed fruit or vegetable into mash to produce rich amount of juice; and said fruit and vegetable juice extractor being characterized in that said disc cutter is provided at a top central area with a plurality of radial rows of blades arranged in the form of a cross, and that one of said central blades has an end extended across center of said disc cutter, such that any dead angle of grinding on said disc cutter is eliminated.

2. The fruit and vegetable juice extractor as claimed in claim 1, wherein said plunger is provided at a bottom end surface with a plurality of teeth arranged in the form of a cross for firmly holding said whole piece of fruit or vegetable fed into said feed tube, so that said fruit or vegetable does not rotate along with said rotating disc cutter and is more smoothly pushed toward said disc cutter for grinding.

3. The fruit and vegetable juice extractor as claimed in claim 1, wherein each row of said blades at the top central area of said disc cutter are curved blades.

4. The fruit and vegetable juice extractor as claimed in claim 1, wherein each row of said blades at the top central area of said disc cutter are a plurality of teeth.

* * * * *